May 21, 1963 L. MANDELKERN ETAL 3,090,735
METHOD FOR MAKING A FIBER WITH REVERSIBLE DIMENSIONAL CHANGES
Filed March 6, 1959 3 Sheets-Sheet 1
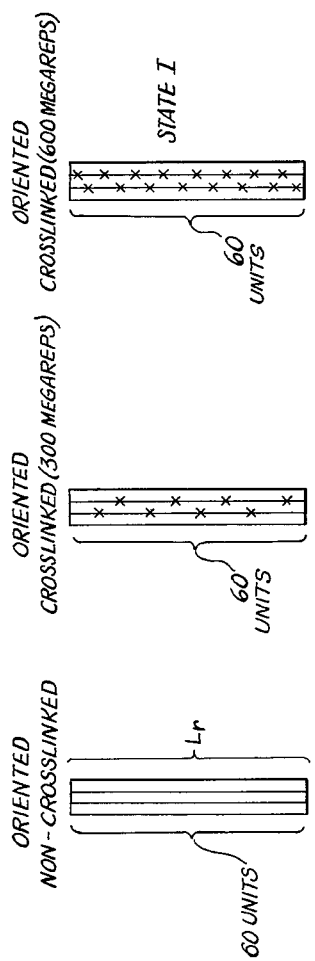
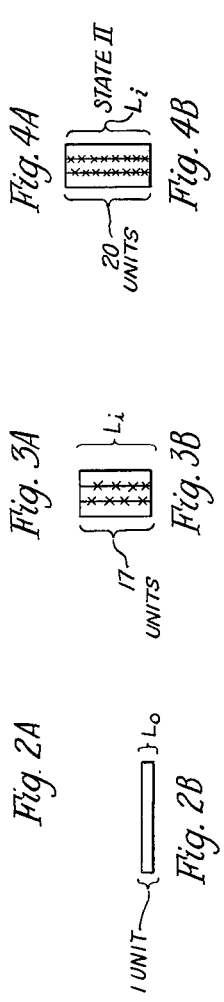
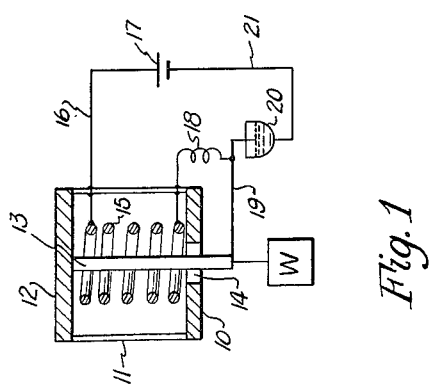
INVENTORS
Leo Mandelkern
Donald E. Roberts
BY Arthur Vinogrod
John C. Stahl
ATTORNEYS

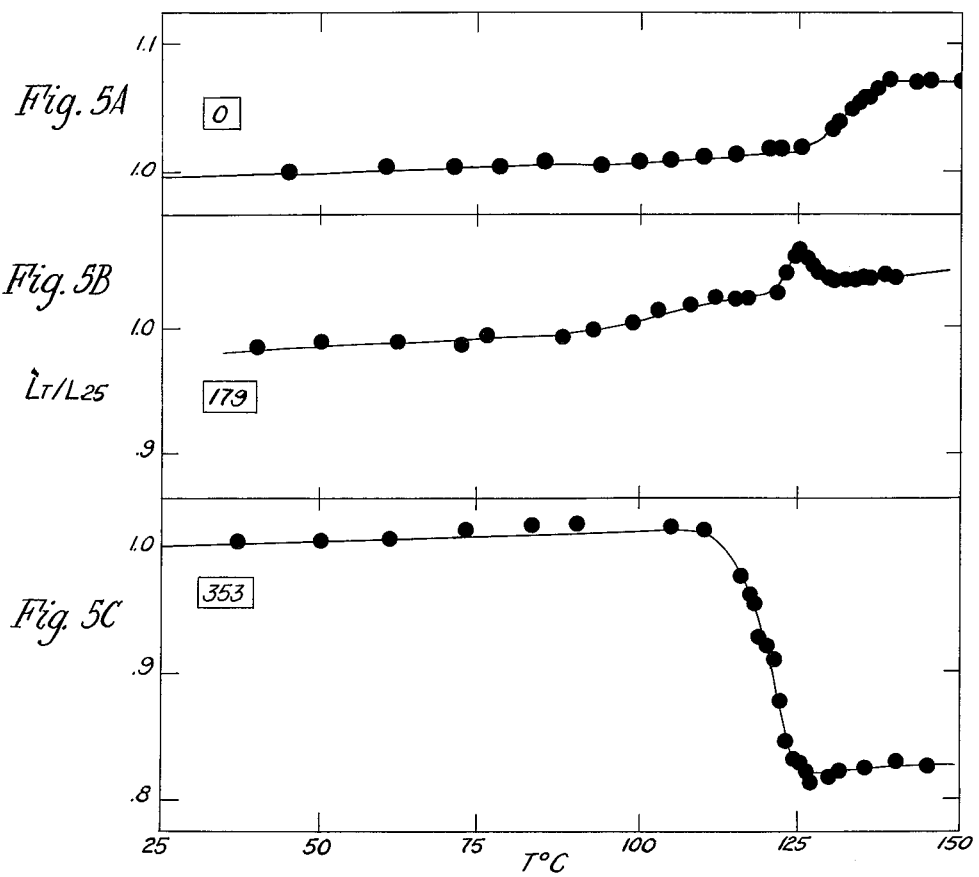
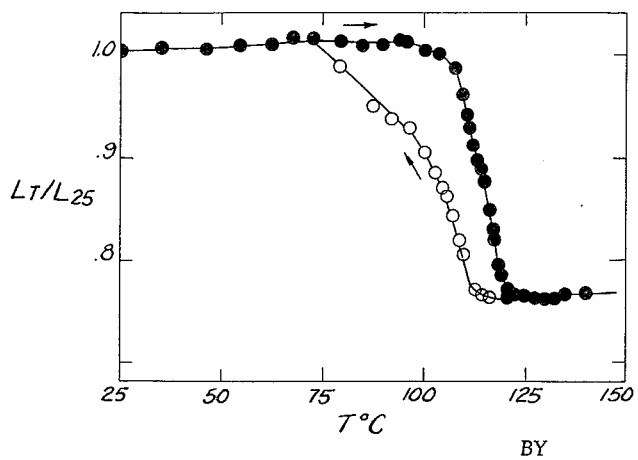

United States Patent Office 3,090,735
Patented May 21, 1963

3,090,735
METHOD FOR MAKING A FIBER WITH REVERSIBLE DIMENSIONAL CHANGES
Leo Mandelkern, Silver Spring, and Donald E. Roberts, Greenbelt, Md., assignors to the United States of America as represented by the Secretary of Commerce
Filed Mar. 6, 1959, Ser. No. 797,818
4 Claims. (Cl. 204—154)

This invention relates to thermal responsive devices and particularly contemplates a crosslinked fibrous polymer which has significant temperature-length characteristics. Specifically, the invention is directed to a crosslinked, highly oriented fibrous polymer which elongates and contracts in a cyclic manner without the necessity of applying a biasing force to the specimen as in prior art devices.

It is well known that crystallization of an oriented polymer fiber is accompanied by an increase in length while contraction will occur on melting such a fiber. Prior to the instant invention, the necessary orientation has been imposed by the application of a tensile force and any dimensional change that occurs during the melting-crystallization cycle can be considered reversible only if an equilibrium bias is maintained on the specimen.

The present invention is based upon the discovery that a highly oriented fibrous polymer, crosslinked by appropriate amounts of high-energy ionizing radiation ranging from 2.7 to 1000 megareps, displays a dimensional change of 0 to 25 percent when subjected to temperature variations without a biasing force being applied to the specimen.

It has been found that fibers which have been treated in this manner contract on melting and when slightly undercooled spontaneously elongate back to their equilibrium length. This process can be repeated indefinitely without any external biasing force being applied to the specimen, and, depending on the crosslinking density, dimensional changes as great as 25 percent may be obtained. This dimensional change with temperature is reversible and sharp.

It is therefore an object of this invention to provide a responder which varies in dimensions in a systematic manner in response to small changes in temperature.

Another object of this invention is to provide a thermodynamically reversible responder which does not require a biasing stress as in the prior art.

Still another object of this invention is to provide a dimensionally reversible material which is very sensitive to changes in the thermodynamic environment and wherein the dimensional change can ocur over an extremely narrow temperature range.

A more specific object of this invention is to provide a transducer for converting thermal or chemical energy to mechanical energy.

Other objects and features of the invention will become apparent to those skilled in the art as the disclosure is made in the following detailed description of a preferred embodiment of the invention as illustrated in the accompanying figures in which:

FIG. 1 illustrates one embodiment of the invention employed in an apparatus for converting thermal energy to mechanical work;

FIGS. 2A–2C are symbolic diagrams illustrating the relative dimensional changes occurring in oriented, non-crosslinked fiber length in different phase-states as represented by States I–III;

FIGS. 3A–3C are symbolic diagrams, similar to FIGS. 2A–2C, showing the change in length in States I–III for an oriented polymer which has been crosslinked by 300 megareps of radiation in accordance with the process of this invention;

FIGS. 4A–4C are symbolic diagrams, similar to FIGS. 3A–3C, for an oriented polymer fiber of the present invention which has been crosslinked by 600 megareps of radiation;

FIGS. 5A–5C show plots of the relative length of a typical crosslinked polyethylene fiber of the invention as a function of temperature wherein the ordinate in each plot is the ratio of the length of the fiber at T° C. and the length of the fiber at 25° C., and the number in the rectangle beside each plot indicates the radiation dosage, in megareps, applied to the fiber;

FIG. 6 shows plots of relative length as a function of temperature for a polyethylene fiber which has received a radiation dosage of 660 megareps where the fiber has been subjected to a heating cycle as illustrated by solid circles and to a cooling cycle as shown by open circles;

Figure 7:
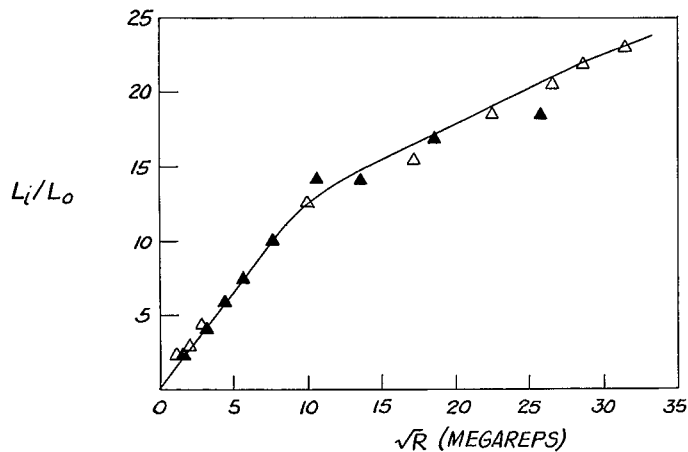
Figure 8:
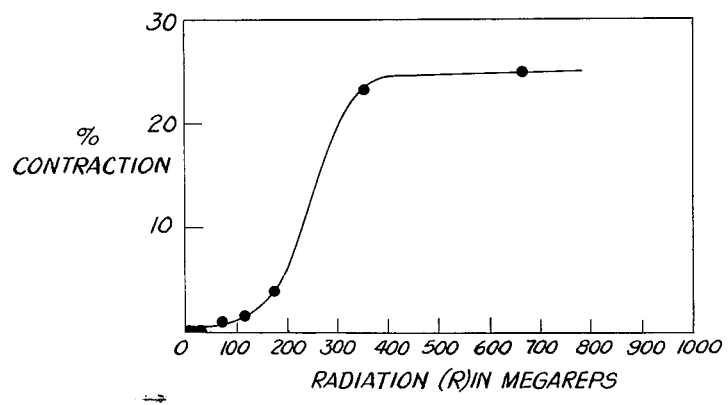

FIG. 7 shows plots for the quantity $L_1/L_0$, the ratio of the length of a highly-oriented, crosslinked specimen in the amorphous state which has been brought to a temperature in excess of the melting point of the specimen compared with the corresponding length of the specimen in the amorphous state into which no crosslinks have been introduced, plotted against the square root of the radiation dose in megareps; and FIG. 8 is a plot of the fractional decrease in length of a specimen going from State III to State II as a function of the radiation dose received by the specimen.

In order that those skilled in the art may better understand how the present invention may be practiced, the following examples are given by way of illustration and not by way of limitation.

The linear polymer used in this invention was manufactured by the Phillips Petroleum Company under the trade name Marlex-50. However, it is to be understood that the method to be described is applicable to any polymeric material which is capable of being prepared in oriented form and crosslinked while being maintained in this state. The polymer was then rendered fibrous and oriented using conventional melt spinning techniques such as are well known in the art.

Crosslinking in accordance with the practice of the present invention was obtained by subjecting samples of the aforementioned fibers to the action of high-energy ionizing radiation. It has been established that the major consequence of this irradiation is intermolecular crosslinking since reactions involving chain scission processes occur only to a limited extent.

Preferably, gamma radiation from a 2500-Curie $Co^{60}$ source operating at a dose rate of $5.7 \times 10^5$ roentgens/hr. was utilized. The specimens were sealed in an evacuated Pyrex tube and maintained at 17° C. for the necessary time interval. Alternatively, crosslinking may be accomplished by electron irradiation from a conventional accelerator, such as a General Electric resonant transformer beam unit, operating at 1000 kvp. and 0.450 milliamperes outbeam current. The dose rate is 10 megarep per pass, each pass being of two minutes duration. The time interval of the irradiation is so controlled that the temperature rise does not exceed 20° C.

It is to be understood, of course, that many other sources of high energy, ionizing irradiation in addition to the sources heretofore described may also be utilized. These sources include fission by-products, separated isotopes, gaseous fission products liberated from atomic reactions and "burnt" uranium slugs; other electron sources such as the betatron and X-rays; and miscellaneous sources such as alpha-particles, deuterons, protons and fission fragments.

Values of the radiation dose to which the samples were subjected range from 2.7 to 1000 megareps, as illustrated in FIG. 7 of the drawings, wherein the abscissas are the square root of the radiation dosage in megareps. Good agreement is obtained in the plots for radiation, $\sqrt{R}$, irrespective of the type of ionizing radiation employed; in said figure the solid triangles designate samples which were subjected to gamma radiation from the $Co^{60}$ source while the open triangles represent samples irradiated by the electron beam in the manner heretofore described.

FIGS. 2–4 of the drawings are diagrammatic illustrations of both untreated and treated fibers in accordance with the principles of this invention, wherein the range of radiation to which the fibers are subjected are divided, for convenience, into three radiation dosage levels. Thus FIGS. 2A–2C show an originally oriented, noncrosslinked fiber; FIGS. 3A–3C an oriented fiber crosslinked by 300 megareps radiation; and FIGS. 4A–4C an oriented fiber crosslinked by 600 megareps radiation.

Specifically, the figures in the drawing are labeled in accordance with phase conditions represented by States I–III, hereinafter to be discussed in detail, in which the fiber may be identified. Thus the three specimens in State I are identified by FIGS. 2A, 3A, and 4A; the specimens in State II are identified by FIGS. 2B, 3B, and 4B; and the specimens in State III are identified by FIGS. 2C, 3C, and 4C.

After the fibers shown in FIGS. 3A and 4A, similar to that shown in FIG. 2A prior to crosslinking, were crosslinked in the manner heretofore described by appropriate amounts of radiation, (FIG. 2A serves as a control and is noncrosslinked), the fibers (FIGS. 2A, 3A, and 4A) were melted at a temperature above the melting point of the specimens (above 140° C.) and then allowed to recrystallize.

Three distinct states of the crosslinked fiber, diagrammatically illustrated in FIGS. 4A–4C, for example, can then be distinguished: the initial state, State I (FIG. 4A); the liquid state, State II (FIG. 4B); and the final state, State III (FIG. 4C) achieved by recrystallization from the liquid state. FIGS. 3A–3C may be similarly labeled in accordance with the procedure outlined in connection with FIGS. 4A–4C. Although the fiber in FIGS. 2A–2C may also be labeled in accordance with this procedure and exhibits characteristic features in each state, it is to be understood that no crosslinks are formed therein and it serves as a control in order that relative dimensional measurements may be made.

The change which occurs in going from the initial state (State I) to the liquid state (State II) is the same for all fibers and represents an irreversible process, since the original fiber can no longer be regenerated merely by cooling. However, States II and III are intraconvertible by subjecting the specimen to conditions which are conducive to either melting or crystallization.

With such designations in mind, reference can now be had to the diagrammatic illustrations in FIGS. 2–4, wherein the symbol $x$ designates intermolecular crosslinks within the fiber.

Subjecting the highly oriented polymer fibers to the radiation doses employed in this invention causes only minor changes in the dimensions of the specimens prior to their melting as is apparent by comparing FIGS. 3A or 4A with the noncrosslinked fiber diagrammatically illustrated in FIG. 2A.

The initial melting of the crosslinked fibers does result, however, in marked irreversible axial contractions which range in magnitude from about sixty-fold for the oriented but nonirradiated material (see FIG. 2B wherein the fiber in State II is one unit in length compared to 60 units for the initial length in FIG. 2A) to about two-fold for the specimens subjected to 1000 megareps radiation. An axial contraction of approximately three-fold is illustrated in FIGS. 3B–4B wherein the lengths are of 17 units and 20 units, respectively, compared to 60 units for FIGS. 3A–4A.

In interpreting the results it is convenient to consider the ratio $L_i/L_0$, in which $L_i$ is defined as the length of a highly-oriented, crosslinked material in the amorphous state which has been brought to a temperature in excess of the melting point of the specimen (above 140° C.), see FIGS. 3B–4B, and in which $L_0$ is defined as the corresponding length of the specimen in the amorphous state into which, however, no crosslinks had been introduced, illustrated in FIG. 2B.

The values obtained for the quantity $L_i/L_0$ are plotted in FIG. 7 as a function of the square root of the radiation dose $R$. The curve is linear for values of the radiation dose up to approximately 100 megareps, corresponding to $L_i/L_0$ of approximately twelve, and extrapolates back to the origin. At the higher levels of irradiation a protracted rate of increase of the quantity $L_i/L_0$ develops; a maximum value of 23 for the ratio $L_i/L_0$ is obtained. By way of comparison in a similar study of natural rubber the maximum value of $L_i/L_0$ of only 3 was obtained.

Theoretical expectations are that the quantity $L_i/L_0$ will increase in direct proportion with the square root of the fraction of units crosslinked. The following expression has been derived relating the isotropic length to the crosslinking density when perfectly axially ordered chains are crosslinked:

$$L_i/L_0 = (L_r/L_0)\{[N_a a/(\sqrt{3}M_0^{1/2}\bar{v})](\bar{r}_0^2/M)^{1/2}\}\rho^{1/2}<\alpha>_0 \quad (1)$$

wherein $L_r/L_0$ is the ratio of initial length to the retracted length of the original fiber into which no crosslinks have been introduced, $N_a$ is Avogadro's number, $a$ is the cross-sectional area of a single chain, $\bar{r}_0^2$ is the unperturbed mean square end-to-end distance of an unconstrained chain of molecular weight M, $M_0$ is the molecular weight of a chain repeating unit, $\bar{v}$ is the specific volume and $<\alpha>_0$ represents the linear dilation of a network relative to its reference state. If the fraction of units crosslinked, $\rho$, is directly proportional to the radiation dose, as has been assumed to be the case for many polymer systems, a straight line would be expected in FIG. 7. The deviation from linearity that occurs in this plot at the higher radiation levels can result from failure of the assumed proportionality between $\rho$ and the radiation dose.

It has been found experimentally for the particular polymer under consideration, whose weight-average molecular weight is 130,000, that the gel point occurs at a radiation dosage of 2.74 megareps. By using the well-known relation between weight average molecular weight and the critical number of crosslinks required for gelation, and assuming proportionality between $\rho$ and radiation dose, the maximum value of the fraction of ethylene units that are crosslinked at 100 megareps is found to be $3.90 \times 10^{-2}$.

In accord with theoretical considerations and previous experimental results, the lengths of the recrystallized fibers (State III) increases as the crosslinking density is increased. An X-ray diffraction analysis of the recrystallized materials at room temperature indicates that the crystallites are randomly arranged in the specimens into which no crosslinks have been introduced, FIG. 2C. However, as the crosslinking density is increased, the concomitant increase in length (see FIGS. 3C and 4C) that occurs manifests itself in the fact that an axial orientation of the crystallites begins to develop. Thus a specimen which has received a radiation dose of 600 megareps, for example, possesses a rather marked axial orientation. Hence by sufficiently crosslinking a highly oriented fiber, a large proportion of the order of the system is maintained even after melting and subsequent recrystallization. It should be emphasized that the orientation is present without the imposition of any external biasing force and is a sole consequence of a sufficient number of crosslinkages being appropriately introduced.

When the environmental temperature of the polyethylene fiber is lowered below that of the melting temperature, hereinafter to be discussed in detail, spontaneous crystallization will occur. The transformation between the crystalline (State III) and liquid states (State II) in polymeric systems is a phase transition of the first order and is governed by the appropriate thermodynamic laws. Though the complete initial melting (State I to State II) of the crosslinked fibers is an irreversible phenomenon, the subsequent melting and recrystallization (States II and III, respectively) are completely reversible processes.

When the crystallites are randomly arranged relative to one another there is no net isotropic dimensional change on melting, and only the latent volume change is observed (see FIGS. 2C–2B). However, when the crystallites are preferentially directed a latent change in dimension along the orientation axis must be observed on melting. Thus for initially axially oriented chain elements a decrease in length will be observed on melting, while the converse situation will result during the crystallization of an axially deformed amorphous network.

The length-temperature relations of some typical fibers are illustrated in FIGS. 5A–5C wherein the specimens at the beginning of measurements are in State III, the equilibrium crystalline state. For all three samples there is noted, at the lower temperatures of measurement, a slight positive thermal expansion coefficient, typical of a crystalline material. Data in the upper curve of this plot, FIG. 5A, represents the recrystallized fiber which had not been crosslinked; an increase of length starting at 125° C. and terminating rather abruptly at 138° C. is evident. This temperature interval corresponds to the melting range of nonirradiated linear polyethylene and the increase in length that is observed is merely a reflection of the latent volume increase that occurs on fusion.

The middle curve, FIG. 5B, represents the data for a sample which received a radiation dose of 179 megareps and in which a preferential axial orientation of the crystallites has begun to develop. During the melting process this fiber first displays a slight increase in its length and then a decrease occurs. Thus, in this instance, there appears to be a compensation between the axial contraction due to crystallite orientation and the latent volume change.

The lower curve, FIG. 5C, represents length-temperature data for a specimen which received a radiation dose of 353 megareps and in which the crystallite orientation is more pronounced. The melting process in this instance results in a 20% axial contraction, which occurs over a very narrow temperature interval (112°–127° C.) and again terminates rather abruptly. The narrow temperature range over which the transformation occurs is characteristic of a cooperative process as is the abruptness at which the process terminates. Above the melting temperature, the length-temperature coefficient is slightly positive and in this region it is characteristic of the expected thermal expansion in the liquid state when no external bias is applied to the specimen.

Referring now to FIG. 6 of the drawings, plots of the relative length of a polyethylene fiber as a function of the temperature, wherein said fiber has been subjected to a radiation dose of 660 megareps, is illustrated. In said figure the heating cycle is illustrated by the upper plots (solid circles) and the cooling cycle by the lower plots (open circles). These plots can be considered to be representative melting curves where the changes in length with temperature have been determined instead of one of the more conventional thermodynamic variables. The relative sharpness of the melting process depicted in FIG. 6 results from the fact that not only is a phase transition occurring but also the polymer undergoing the transformation is a homopolymer. For a copolymeric substance, one in which not all the chain repeating units participate in the crystallization process, the melting range will become much broader, even though the fusion is still describable as a first-order phase transition.

On cooling the polyethylene specimens recrystallization will occur and concomitant with this process the samples regain their original dimensions. The reversibility of the dimensional change that accompanies the crystal-liquid process is illustrated in FIG. 6 by the open circle plots.

The relative length as a function of temperature is plotted in this figure for a specimen which received a radiation dose of 660 megareps and as indicated a 25% contraction is observed on melting. When the sample is slowly cooled after the completion of the fusion process, supercooling occurs, as is indicated in the figure. This supercooling is characteristic of the crystallization from the melt of all polymeric systems and is a consequence of the fact that the crystallization process is governed by a nucleation mechanism. Despite the occurrence of supercooling, the original dimensions of the sample are eventually regained. The time required for the return to the original state can be substantially reduced by bringing the sample immediately to a large value of undercooling rather than adopting a slow cooling process. The melting-crystallization process is then completely cyclic and there is obtained a thermodynamically reversible contractile system.

The magnitude of the reversible anisotropic dimensional change that occurs on melting depends on the orientation of the fiber in State III and the number of crosslinkages that were initially introduced. In FIG. 8 there is plotted the fractional change in length that occurs on melting as a function of the radiation dose received by the sample, it having previously been shown that an estimate of the maximum value of $\rho$ can be made by assuming that this quantity is proportional to the radiation dose. At the lower levels of irradiation no contractions are observed on melting until a sample has received a radiation dose of about 100 megareps, corresponding to a value of $\rho$ equal to $3.90 \times 10^{-3}$. At this crosslinking level, where in the amorphous state $L_i/L_0$ equals twelve, crystallite orientation has just begun to develop and consequently a small contraction is observed. From about 100 to 350 megareps of irradiation a continuous increase occurs in the amount of reversible contraction that is observed, and a maximum change in length of 25% is achieved at a value of $\rho$ equal to $1.35 \times 10^{-2}$. This change in length remains invariant in samples which have received larger doses. In the dose range between 100 and 350 magareps the orientation becomes more perfectly developed, and continuously larger contractions are observed despite the fact that the equilibrium length the amorphous state is concurrently also increasing. A point is eventually reached, however, where a compensation develops between the orientation in the crystalline state and the increased length in the amorphous state so that the amount of contraction remains essentially invariant with further crosslinking.

Referring now to FIG. 1 of the drawings, the device disclosed was developed by Dr. Samuel G. Weissberg of the National Bureau of Standards. The device, using an embodiment of the present invention as a working substance, illustrates one arrangement for converting thermal energy to mechanical work and includes a housing 11 having end plates 10 and 12. The fiber 13 of this invention is attached at one end to plate 12, the other end thereof extends through a hole 14 in plate 10 and is secured to a weight W. A heater coil 15 is provided in housing 11 and surrounds fiber 13. One end of the coil is connected by lead 16 to a voltage source 17, the other end of the coil is connected to a torsion spring 18. A contact arm 19 is connected to the free end of fiber 13 and to torsion wire 18 to provide a closed electrical circuit through mercury cup 20 and lead 21 when fiber 13 is in an extended condition. Upon closing of said circuit, coil 15 will heat fiber 13 causing contraction of fiber 13 in accordance with the principles already discussed. Upon contraction, contact 19, attached to fiber 13 will be withdrawn from the mercury cup and the circuit will be broken. Upon cooling to the equilibrium state, fiber 13 will elongate in accordance with the discussed principles and the aforementioned steps will be repeated.

In the system described thermal energy is utilized to initiate the transformation between the crystalline and amorphous states. This phenomenon is, of course, more general, and in principle the phase transition can also be initiated by an appropriate chemical reaction. Thus for a macromolecular system which was chemically more reactive and which was rendered fibrous and crosslinked in this state, in a manner similar to which the polymer fibers were prepared, contraction will still occur on fusion and spontaneous elongation on recrystallization. For such a system the fusion processes could be carried out isothermally by a variety of chemical means such as are well known in the art, and an engine capable of converting chemical energy to mechanical energy would result.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. The method of making a reversible heat-sensitive responder comprising the steps of crosslinking a highly oriented polyethylene fiber by exposure to high energy ionizing radiation in the order of 2.7 to 1000 megareps, subjecting said fiber to a temperature in excess of the melting point of the fiber for a period sufficient to melt said fiber, and allowing the fiber to recrystallize.

2. The method of making a reversible thermal-responsive element comprising the steps of crosslinking a highly oriented polyethylene fiber by exposure to high energy ionizing radiation at a level in the order of 300 to 1000 megareps, subjecting said fiber to a temperature in excess of the melting point of the fiber for a period of time sufficient to melt said fiber, and allowing the fiber to recrystallize.

3. The method of making a reversible heat-sensitive responder comprising the steps of crosslinking a polyethylene fiber of high axial orientation by high energy ionizing radiation in the order of 2.7 to 1000 megareps, subjecting said fiber to a temperature in excess of 140° C. for a period of time sufficient to melt said fiber, and allowing the fiber to recrystallize.

4. The method of making a reversible heat-sensitive responder comprising the steps of crosslinking a highly oriented polyethylene fiber by exposure to high energy ionizing radiation, subjecting said fiber to a temperature in excess of the melting point of the fiber for a period sufficient to melt said fiber and allowing the fiber to recrystallize.

References Cited in the file of this patent

UNITED STATES PATENTS

| | | |
|---|---|---|
| 2,948,666 | Lawton | Aug. 9, 1960 |
| 2,981,668 | Brasch | Apr. 25, 1961 |

FOREIGN PATENTS

| | | |
|---|---|---|
| 739,709 | Great Britain | Nov. 2, 1955 |
| 761,766 | Great Britain | Nov. 21, 1956 |

OTHER REFERENCES

"Industrial and Engineering Chemistry," vol. 45, pages 11A, 13A, September 1953.

Nucleonics, June 1954, page 20.